United States Patent
Kristinsson et al.

(10) Patent No.: US 11,772,659 B2
(45) Date of Patent: Oct. 3, 2023

(54) VEHICULAR ANOMALY DETECTION, REPORTING, AND DYNAMIC RESPONSE

(71) Applicant: FORD GLOBAL TECHNOLOGIES, LLC, Dearborn, MI (US)

(72) Inventors: Johannes Geir Kristinsson, Ann Arbor, MI (US); Fling Tseng, Ann Arbor, MI (US); Himanshu Verma, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 17/319,418

(22) Filed: May 13, 2021

(65) Prior Publication Data

US 2022/0363267 A1    Nov. 17, 2022

(51) Int. Cl.
*B60W 40/09*    (2012.01)
*B60W 40/02*    (2006.01)
*B60W 40/107*    (2012.01)

(52) U.S. Cl.
CPC ............ *B60W 40/09* (2013.01); *B60W 40/02* (2013.01); *B60W 40/107* (2013.01); *B60W 2554/4041* (2020.02); *B60W 2756/10* (2020.02)

(58) Field of Classification Search
CPC .... B60W 40/09; B60W 40/02; B60W 40/107; B60W 2554/4041; B60W 2756/10
See application file for complete search history.

(56) References Cited

U.S. PATENT DOCUMENTS

| | | | |
|---|---|---|---|
| 1,038,828 A1 | 6/2019 | Hampiholi | |
| 10,540,892 B1* | 1/2020 | Fields | B60W 40/09 |
| 10,745,010 B2* | 8/2020 | Fukuda | G08G 1/0112 |
| 11,011,061 B2* | 5/2021 | Ferguson | G01C 21/32 |
| 2015/0127191 A1 | 5/2015 | Misra et al. | |
| 2016/0373473 A1* | 12/2016 | Truong | G01C 21/28 |
| 2017/0365105 A1 | 12/2017 | Rao et al. | |
| 2018/0115898 A1* | 4/2018 | Han | G08G 1/161 |
| 2019/0126943 A1* | 5/2019 | Sakuma | G06Q 50/30 |
| 2019/0291751 A1 | 9/2019 | Jain et al. | |
| 2019/0376809 A1* | 12/2019 | Hanniel | G01C 21/3602 |
| 2020/0193198 A1* | 6/2020 | Wang | G06V 20/597 |
| 2020/0198651 A1* | 6/2020 | Levy | G05D 1/0297 |
| 2020/0271457 A1* | 8/2020 | Sato | G08G 1/0112 |
| 2020/0334554 A1* | 10/2020 | Takahashi | G06F 11/3065 |

(Continued)

*Primary Examiner* — Fadey S. Jabr
*Assistant Examiner* — Naeem Taslim Alam
(74) *Attorney, Agent, or Firm* — Joseph Zane; Brooks Kushman P.C.

(57) ABSTRACT

A vehicle may determine that erratic vehicle behavior has been sensed, based on comparison of a sensed vehicle behavioral characteristic at a given location compared to a predefined expected value of the characteristic. The vehicle may further determine whether an environmental anomaly has been detected in association with the given location and classify the sensed erratic behavior based on whether the environmental anomaly was detected. Responsive to classifying the behavior as erratic based on determining no environmental anomaly was detected, the vehicle may report the erratic behavior to a remote server, along with the given location. The remote server may receive a plurality of such reports for a given location and update a classification of the behavior based on data indicated in the plurality of reports.

15 Claims, 4 Drawing Sheets

(56) References Cited

U.S. PATENT DOCUMENTS

| | | | |
|---|---|---|---|
| 2020/0393255 A1* | 12/2020 | Freese | G01C 21/3484 |
| 2021/0396528 A1* | 12/2021 | St. Romain | G01C 21/3841 |
| 2022/0126840 A1* | 4/2022 | Batra | B60W 50/14 |
| 2022/0219714 A1* | 7/2022 | Nemoto | H04W 4/90 |

* cited by examiner

VEHICULAR ANOMALY DETECTION, REPORTING, AND DYNAMIC RESPONSE

TECHNICAL FIELD

The illustrative embodiments generally relate to systems, methods and apparatuses for vehicular anomaly detection, reporting and dynamic response.

BACKGROUND

Advanced driving systems like adaptive cruise control allow a vehicle to control its own speed responsive to detected proximity to leading vehicles. For example, if the vehicle travels too close to the leading vehicle, then the vehicle may brake. If the distance grows, the vehicle may accelerate. If a trailing vehicle approaches too quickly and there is room to accelerate, the vehicle may accelerate. These reactive systems allow general accommodation for crowd-based behavior, tending to keep a vehicle more or less moving with the pack.

At the same time, many vehicles on the road may exhibit apparently anomalous behavior. For example, one or more vehicles may swerve erratically, accelerate or brake unexpectedly, or otherwise behave in a manner seemingly inconsistent with the flow of traffic. While certain of these anomalies are the result of erratic driver behavior, a proximate driver does not know if the erratic vehicle is responding to a road-based or weather anomaly, or if the driver simply spilled coffee in their lap or decided to speed. Moreover, any given individual may exhibit behavior deviant from the crowd, but which is perfectly normal for that individual. In such an instance, while other drivers may not like to drive too proximate to such a driver, it may be useful at least if those drivers could know that this is just how this individual drives. At least this would provide some assurance that something completely unexpected has happened with the driver or the vehicle.

It may be difficult for conventional vehicle sensor systems, even those with adaptive cruise control, to react to all such anomalies appropriately. Certainly those vehicles do not tend to alert drivers of aberrant behavior and/or whether apparently aberrant behavior is, in fact, normal. Lacking sufficient data, the best these vehicles can often do in a quasi-autonomous manner is to simply slow down or speed up to change proximity to such a vehicle. Drivers may elect to do the same, simply out of caution, but even the driver is acting on incomplete information.

SUMMARY

In a first illustrative embodiment, a system includes a processor configured to determine that erratic vehicle behavior has been sensed, based on comparison of a sensed vehicle behavioral characteristic at a given location compared to a predefined expected value of the characteristic. The processor is further configured to determine whether an environmental anomaly has been detected in association with the given location. Also, the processor is configured to classify the sensed erratic behavior based on whether the environmental anomaly was detected and responsive to classifying the behavior as erratic based on determining no environmental anomaly was detected, report the erratic behavior to a remote server, along with the given location.

In a second illustrative embodiment, a system includes a processor configured to receive a report of observed erratic behavior relating to a first vehicle at a location. The processor is further configured to access reporting from a plurality of other vehicles indicating whether the plurality of other vehicles observed one or more indicators of an anomaly at the location. The processor is additionally configured to, responsive to the plurality of other vehicles observing one or more indicators of an anomaly, respond to the report with an indication that the behavior is non-erratic, and, based on the report, update data indicating the presence of the anomaly at the location, including updating a confidence value. Also, the processor is configured to, responsive to the updating resulting in a confidence value above a threshold, send an alert to vehicles within a predefined proximity of the location, indicating the presence of the anomaly.

In a third illustrative embodiment, a method includes determining that erratic vehicle behavior has been sensed, based on comparison of a sensed vehicle behavioral characteristic at a given location compared to a predefined expected value of the characteristic, defined with respect to a driver profile for a driver of a vehicle for which the erratic behavior was sensed. The method further includes determining whether an environmental anomaly has been detected in association with the given location, based on at least one of memory onboard the vehicle indicating a record of the anomaly or a sensor of the vehicle sensing the anomaly. Also, the method includes classifying the observed erratic behavior based on whether the environmental anomaly was detected and, responsive to classifying the behavior as erratic based on determining no environmental anomaly has been detected, reporting the erratic behavior to a remote server, along with the given location.

DETAILED DESCRIPTION

Figure 1:
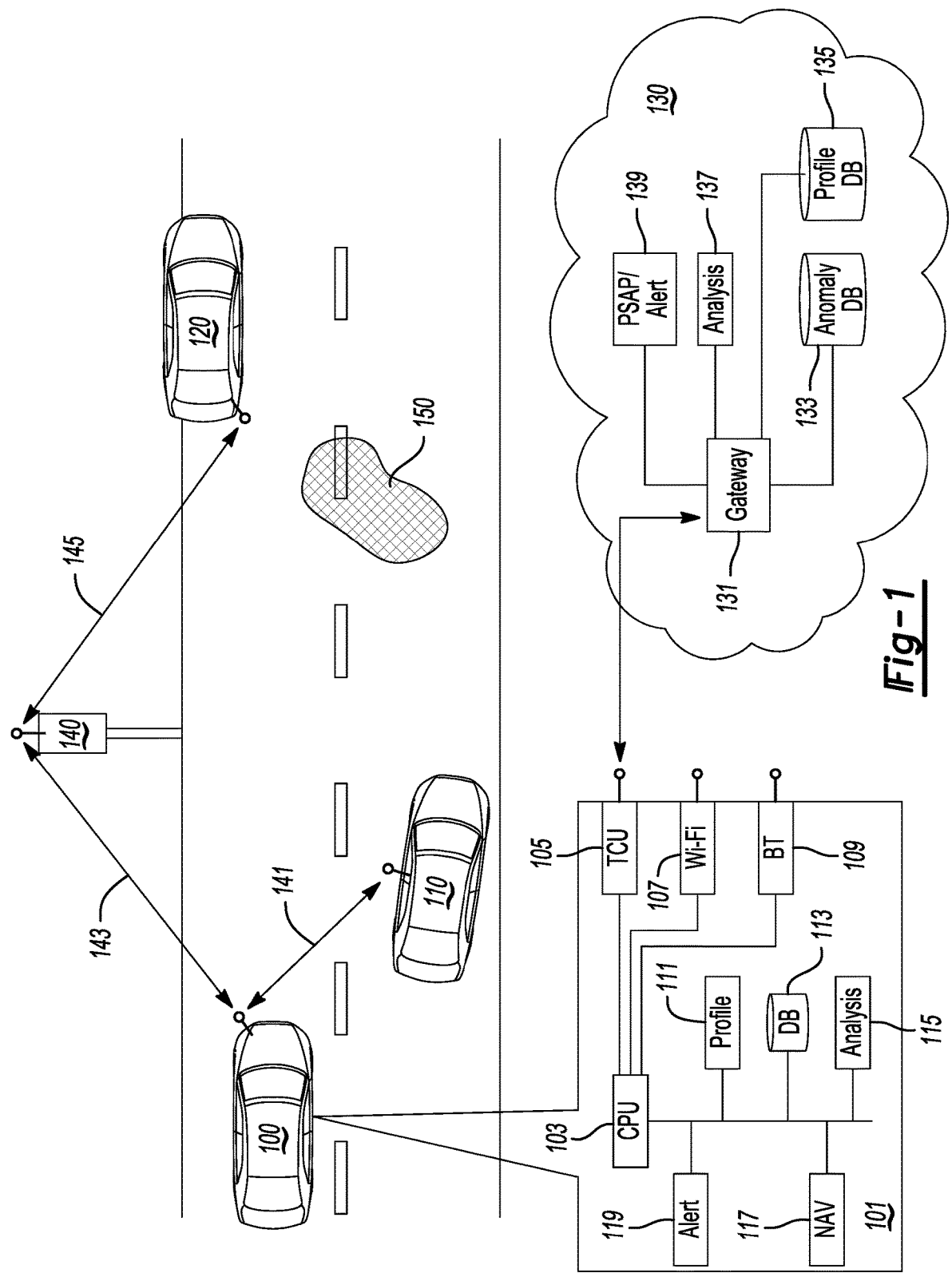
FIG. 1 shows an illustrative multi-vehicle situation with an illustrative onboard vehicle computing system and a cloud-based backend.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (ACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Since current vehicles both include complex computing systems and have communication capability with even more-powerful computing systems, it is possible to model situations that are more complex than whether or not a leading vehicle or trailing vehicle is changing speed or becoming too proximate. As available data sets become more complex, computers can start to answer the question as to why something might have occurred, as opposed to simply answering the question as to whether something occurred.

The illustrative embodiments present non-limiting examples of various data that can be contemplated when making a decision about whether or not behavior is erratic or an appropriate response, as well as what to do with that information once a conclusion has been drawn. This improves the ability of both drivers and autonomous or semi-autonomous vehicles to react to developing situations or observed behavior, by providing better insight into whether or not the behavior is something that should be responded to, and how extreme that response should be. The data gathering and modeling can also be used to improve the understanding of traffic behavior at certain points, times of day, under certain conditions, etc., and can be used to identify environmental anomalies that result in seemingly erratic behavior.

FIG. 1 shows an illustrative multi-vehicle situation with an illustrative onboard vehicle computing system and a cloud-based backend. In this example, three vehicles 100, 110, 120 are traveling along a road in relative proximity to each other.

Vehicle 100 includes an illustrative onboard computing system 101, which also may be included in the other vehicles 110, 120, or included as a variant of the system shown in 101. Not all elements are necessary, as much of the processing can be done onboard or in the cloud, and as long as a vehicle has at least a local communication connection with other vehicles it can receive some form of updated information.

If the vehicle can communicate with the cloud, through, for example, a cellular connection or through a Wi-Fi connection to a dedicated short range communication (DSRC) transceiver 140, then the vehicle can leverage computing on the cloud to perform analysis and decision making. If the onboard computing capability is sufficient, the vehicle can perform at least certain aspects of the analysis and decision making onboard. As such, it will be appreciated that where appropriate, analysis and decision making can occur wherever desired and where capability exists.

In this example, vehicle 100 includes one or more onboard processors 103 providing cloud-based communication through a telematics control unit (TCU) 105, which provides a cellular connection usable when a cellular signal is present. The vehicle 100 may also include a Wi-Fi transceiver 107 usable to communicate with other vehicles 110, 120 and local networks 140. A BLUETOOTH transceiver 109 can allow for V2V communication as well.

Since most communication requires credentialing, and vehicles may not know each other's connection credentials to handshake, it is possible to simply broadcast information via BLUETOOTH, for example. The broadcast can indicate an anomaly or erratic behavior, as well as an observing-vehicle location, anomaly location, and/or any identifiers related to an erratic vehicle. The broadcast can be received by, for example, the erratic vehicle or other vehicles, and can be used to take appropriate action, which can include, for example, alerting a driver of the erratic vehicle and/or causing other drivers to be alerted or other vehicle systems to respond to the erratic behavior or anomaly.

The data may "identify" the erratic vehicle through detectable visual characteristics (e.g., color, type, license plate, etc) or through observation of behavior. For example, with regards to the latter, the broadcast could include data indicating that a vehicle was observed at a certain location that accelerated more than 15 mph over a brief span and then swerved more than 3 feet off-center. The offending vehicle may actually be able to use this information to self-identify, if vehicles have a record of recent behavior stored onboard, and other vehicles/drivers can look for a vehicle exhibiting such behavior. Or, merely knowing that such a vehicle is ahead, some drivers may choose to either change lanes, change roads or decelerate to avoid encountering the vehicle, without ever having to know exactly which vehicle.

Broadcast of road-based and environmental anomalies may be used to update onboard data set (e.g., recording a pothole 150) and verify or dismiss erratic behavior as having been not caused or caused by a later-identified anomaly. For example, vehicle 110 may be detected as swerving, but if the pothole 150 is known, then this behavior may be an appropriate response to the pothole and thus not classified as an anomaly. At the same time, vehicle 120 may be observed by vehicle 100 as having left the road, and in the absence of a roadway anomaly such as 150, this may be properly classified as erratic behavior. Vehicle 100 can communicate with both vehicle 110 and vehicle 120 via communication 141 and 143 to advise of the detected vehicle behavior as well as receive information that may be useful in classifying the behavior. In this example, communication 143 passes through DSRC transceiver 140 and is relayed as communication 145 to vehicle 120. This may be another method of broadcast and response, as all vehicles 100, 110, 120 may be permitted to connect to, and may be connected to, DSRC transceiver 140.

Vehicle 120 may receive the broadcast and self-identify as the vehicle 120 that had erratic behavior. Based on a driver profile, for example, or an onboard biometric indicating sleepiness or other measurables, the vehicle 120 may confirm the erratic behavior or report that the behavior is within an expected range of driver behavior. This information can be relayed back to vehicle 100 and relayed forward from vehicle 100 to vehicle 110. In this manner, data can constantly be exchanged between vehicles 100, 110, 120 and other vehicles to continually make improved decision making based on more complete information.

Vehicle 100 may also include a variety of onboard software processes such as, for example, a driver profile 111, a database of known anomalies 113, which may be stored in conjunction with map tiles or other navigation data, an analysis process 115, a navigation process 117, a driver alert process 119 and other useful processes, computing functions, electronic control units, etc.

The driver profile may store recorded and modeled behavior for one or more drivers of the vehicle 100. The presence of a driver can be detected by a variety of functions, such as phone-detection where a phone correlates to a known driver, visual detection with a camera, and even profiling drivers such that their actual behavior reveals which driver is driving. As the data set for the driver grows, better and better expected model behavior can be developed, which will make it easier and faster to identify anomalous behavior. Aberrant and erratic events can be detected and logged, and can even later be discarded if it is revealed that an environmental anomaly was proximate to the logged behavior, or, for example, if a number of additional unrelated vehicles exhibited the same or similar behavior at the same location, even if an actual environmental anomaly couldn't be found or logged.

For example, a driver may never accelerate past a certain threshold in "normal" behavior, but that driver may drive proximate to a raging fire and quickly speed past. This would initially appear to be erratic, but as more and more vehicles sped past the fire, it would be clear that something at that location was causing drivers to accelerate, even if the fire itself were never observed. Since the fire is not, in this example, on the road, the only indication of the environmental anomaly would be the consistent apparently "erratic" behavior of a number of vehicles at the same location. Nonetheless, the consistency of behavior can be a predicate for assuming something is causing the behavior and fifty drivers did not simply randomly decide to accelerate within 200 yards of the same roadway location within a 30 minute time span.

Since the original driver of 100 will likely be long gone by the time the crowd behavior is modeled, the vehicle 100 may not initially know that the driver's behavior was not erratic, especially if the driver was one of the first to spot and respond to the fire. But since the cloud 130 can serve as a repository and distribution point of information, the vehicle 100 can later be informed of the apparent anomaly and adjust the onboard profile model accordingly, which, in this case, would be to discard the behavior or at least tie the behavior to how the driver behaves when an actual anomaly was present. In the latter case, for example, if the driver had 200 instances of speeding away from a dangerous situation logged over a decade of travel, and otherwise drove cautiously, then when the driver suddenly accelerates at a later time, it is not an unreasonable guess that there was an environmental cause, which can even cause the cloud systems to start trying to gather more data about the location where the driver sped, in order to determine the source of the predicted anomaly.

The onboard database 113 may include localized anomalies or possible anomalies, which may also be tied to map tiles. So, for example, if the vehicle 100 stores map tiles within 10 miles of a home-location and map tiles within 5 miles of a present location, some data may be discarded and reloaded as the vehicle updates these tiles as it travels. If the anomaly were in the home-location data set, it may persist as a record until the home location changes, but otherwise it may be discarded as a vehicle 100 moves. If the anomaly has been reasonably confirmed by the vehicle 100, it may not discard that single record until it has some assurance that the cloud anomaly database 133 has also recorded the anomaly, so that the vehicle 100 can still have a record of the anomaly if it later travels back to that location.

The analysis process 115 may analyze immediately and recently observed behavior, against both a driver profile and against behavior observed with regards to other vehicles 110, 120. For example, if the vehicle 100 observes vehicle 110 swerving, but does not observe pothole 150, it may initially classify this as erratic behavior for vehicle 110, which vehicle 110 might even confirm through broadcast communication, if vehicle 110 did not detect the pothole 150 either. But, moments later when vehicle 100 either swerves also or hits the pothole, it will know that the behavior of 110 was not erratic without reason, and thus it can log a reason and inform vehicle 110 that the model for the driver of 110 should not reflect erratic swerving, because 100 did the same thing or actually hit the pothole, either one of which may serve to confirm that the original behavior was not erratic.

The cloud-based analysis process 137 can be used in lieu of or to supplement the onboard process 115, and may have access to a wider record of profiles 133 and anomalies 137, as well as have greater computing power. So, if vehicle 100 observed the situation above, it could devise its own analysis and also report the apparent erratic behavior to the cloud. The cloud could then potentially already know of pothole 150 or have other information that could be used to supplement the analysis performed by the vehicle 100. The cloud may have also received a report from vehicle 110, and can use that reported information to supplement the analysis provided by vehicle 100, by first confirming that vehicle 110 thought the swerve was an anomaly, and then moments later realizing that vehicle 100 reported doing the same thing, and thus report back to vehicle 110 that the behavior was appropriate. This is a useful way of conveying the information between vehicles if they cannot directly communicate in a meaningful manner, and this feedback and improving information allows the onboard modeling to be more assured of accuracy.

The navigation process 117 may function as a standard navigation process, but may also indicate locations where anomalies are observed, such as pothole 150, locations where erratic behavior is observed, and may even provide immediate data about surrounding vehicles. Since the process is unlikely to know exactly where the surrounding vehicles are located, as they continue to move, it may use referential indicators like colors and arrows to show areas-of-avoidance ahead. For example, detecting erratic behavior in vehicle 120 may cause the navigation process to recommend the right-most lane shown, or recommend slowing down or accelerating past vehicle 120.

The alert process 119 can work in conjunction with the navigation 117 and analysis 115 processes and serve several alert functions. It can serve to alert a driver of various external or self-observed events (e.g., either warn them of upcoming issues or ensure the driver is properly alert if the vehicle itself behaves erratically). It can alert the cloud 130, which can then alert a public safety access point (PSAP) or other authority figure through process 139 if the erratic behavior is severe. The alert process 119 can also alert other vehicles 110, 120, both in order to tell a vehicle 120 that it is being apparently erratic and to tell other vehicles 110 about the observed behavior.

Figure 2:
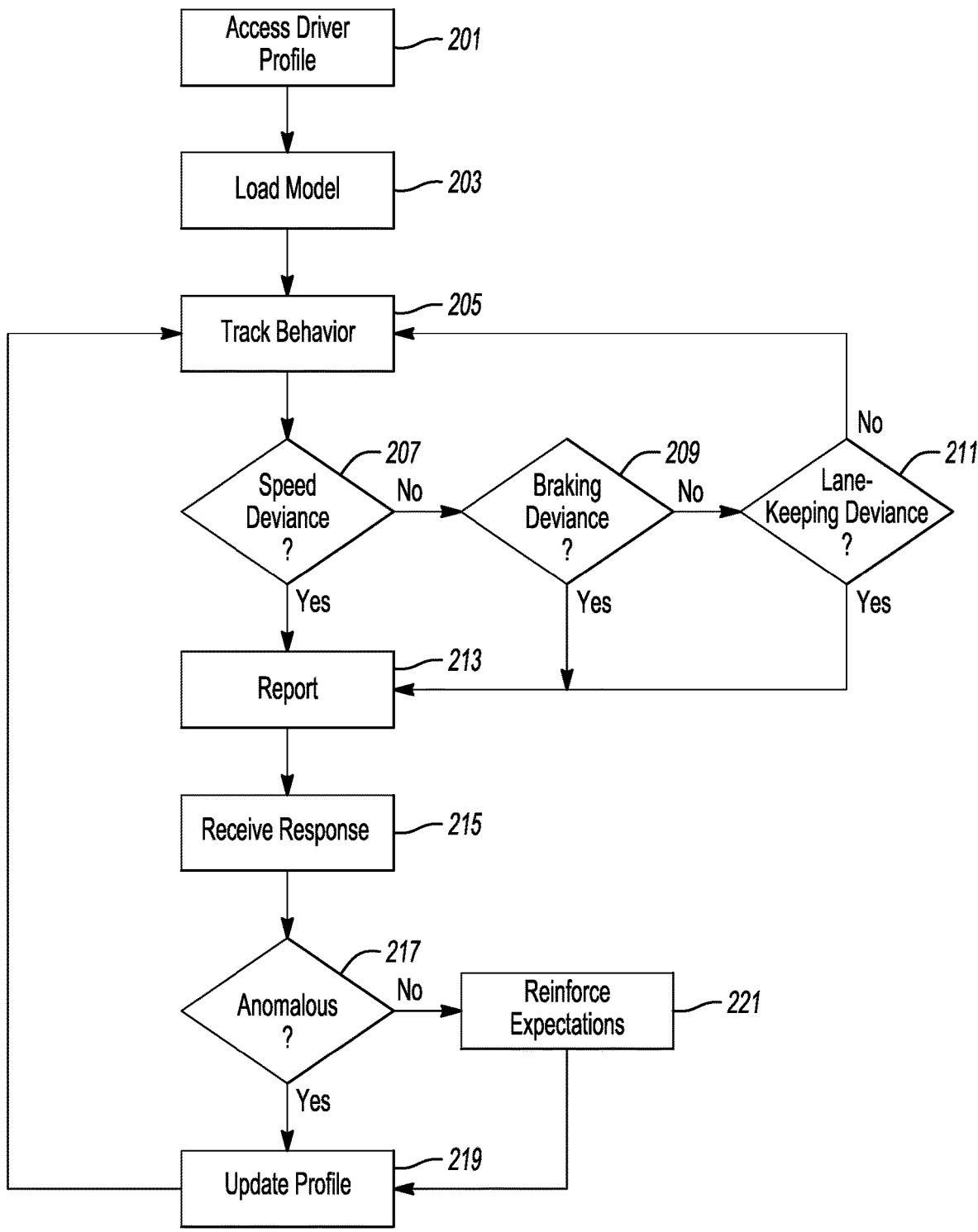
FIG. 2 shows an illustrative anomaly detection and reporting process from the perspective of at least a vehicle.

FIG. 2 shows an illustrative anomaly detection and reporting process from the perspective of at least a vehicle. In this embodiment, when a vehicle 100 is traveling, an analysis process 115 can access a driver profile 111. Or, a cloud-based analysis process 137 can access a vehicle-stored profile 111 or a cloud-stored profile 135. This example will be described as though the process occurs onboard the vehicle 100, but for illustration purposes only.

From the driver profile for an identified driver, or for a "vehicle driver profile" if the vehicle 100 cannot distinguish between drivers and simply models its own observed behavior as the "driver behavior," representing an aggregation of the driver behavior of multiple, but likely few, drivers, the vehicle 100 can load expected model behavior at 203. This can include, for example, speed parameters defining thresholds of speed limits within which the driver usually travels (e.g., 5 miles below up to 10% above), braking aggressiveness expectations, lane-keeping expectations, etc. Many different observable driver behavior variables can be observed and modeled, and again, the previously noted variables are for illustration purposes only. The general concept is to provide the vehicle 100 analysis process 115 with a baseline against which to compare observed behavior to determine if the behavior is truly erratic, among other things.

While the vehicle 100 travels, the process 115 tracks any state variables used in modeling the behavior, both for data-gathering purposes and for identification of erratic behavior purposes. In this example, for illustration, the process 115 considers whether the speed has deviated by more than an expected threshold at 207, whether the braking is more aggressive than expected at 209 and whether the lane-keeping is within expected tolerance at 211. As long as the behavior remains within expected boundaries or thresholds, the process 115 continues to gather and analyze data, which can be added to the overall data set to improve measured behavior and increase the confidence of the thresholds against which comparison is made.

If there is apparently erratic behavior represented by performance outside expected boundaries, the process 115 may report this behavior to the cloud 130 at 213 through the gateway 131. The analysis process 137 may analyze the behavior with regards to a larger data set, to compare, for example, whether the behavior reflects what other vehicles 110, 120 have been observed doing at similar locations. The cloud 130 may also respond with the results of this analysis, received by the vehicle 100 at 215, which can help the vehicle 100 process 115 conclude whether or not the behavior is, in fact, anomalous at 217.

Since the behavior may simply represent a first-encounter with an environmental hazard, the fact that the cloud process 137 does not indicate the behavior is appropriate is not necessarily dispositive, but at the moment of confirmation it can be treated thusly. At a later point in time, if other vehicles 110, 120 are observed undergoing the same behavior, the conclusion with regards to the observed behavior can always change. At that moment in time, however, barring any reason to conclude otherwise, the process 115 can update the profile 219 with the erratic behavior and, if the behavior warrants sharing, broadcast the information to surrounding vehicles 110, 120 so they can take any desired action. If the behavior is not anomalous, or is confirmed as being non-anomalous, the process 115 can reinforce the existing models at 221 with some reasonable assurance that the erratic behavior had a good reason for existing.

In this and similar manners, it is possible to continually improve the modeling of driver behavior and continually improve the ability to determine when a driver is truly behaving in what is characterizable as erratic and unexpected manners.

If the anomaly is a low deviance, e.g., less than a standard deviation outside of expectations, the process 115 may alert the driver as to the deviance and may use vehicle control systems, if desired, to bring the behavior back in line with the driver expectations. If the behavior is a high deviance, e.g., multiple deviations from expectations, the process may engage onboard detection to ensure the driver's well being, as well as run any necessary diagnostic reports and potentially even contact emergency services for assistance if something seems severely amiss as a result of the follow-up analysis.

The process may report some or all erratic behavior to neighboring vehicles 110, 120 as well. If the reported behavior is low on the erratic side, but qualifies as erratic, the neighboring vehicles may provide recommendations or controls to keep the vehicle in a separate lane or maintain a one lane gap if possible. Passing such a vehicle may result in an enhanced caution alert from the neighboring vehicle—e.g., some form of warning to the driver engaging in the passing that there is a chance of unexpected behavior.

If the reported erratic behavior is highly erratic, the adjacent and neighboring vehicles can tell drivers to create distance between themselves and the vehicle (slowing or speeding away), provide color coded or other visual guides as to where the vehicle 100 of interest is located relative to the adjacent vehicle, with varied colors and degrees of alert based on level of erratic behavior observed and reported, or even engage autonomous or semi-autonomous systems to create space between the receiving vehicle and the reporting vehicle.

The cloud 130 can also report to localized vehicles 110, 120 based on their locations and the location of the erratically behaving vehicle 100. A similar process can be used to observe behavior of other vehicles, except that the analysis process will typically lack a baseline for the other vehicle driver. Nonetheless, based on generalized baseline behavior, the observing vehicle 100 can at least determine whether the observed vehicle is behaving in a generally expected manner by comparing observed behavior to crowd-modeled thresholds.

Figure 3:
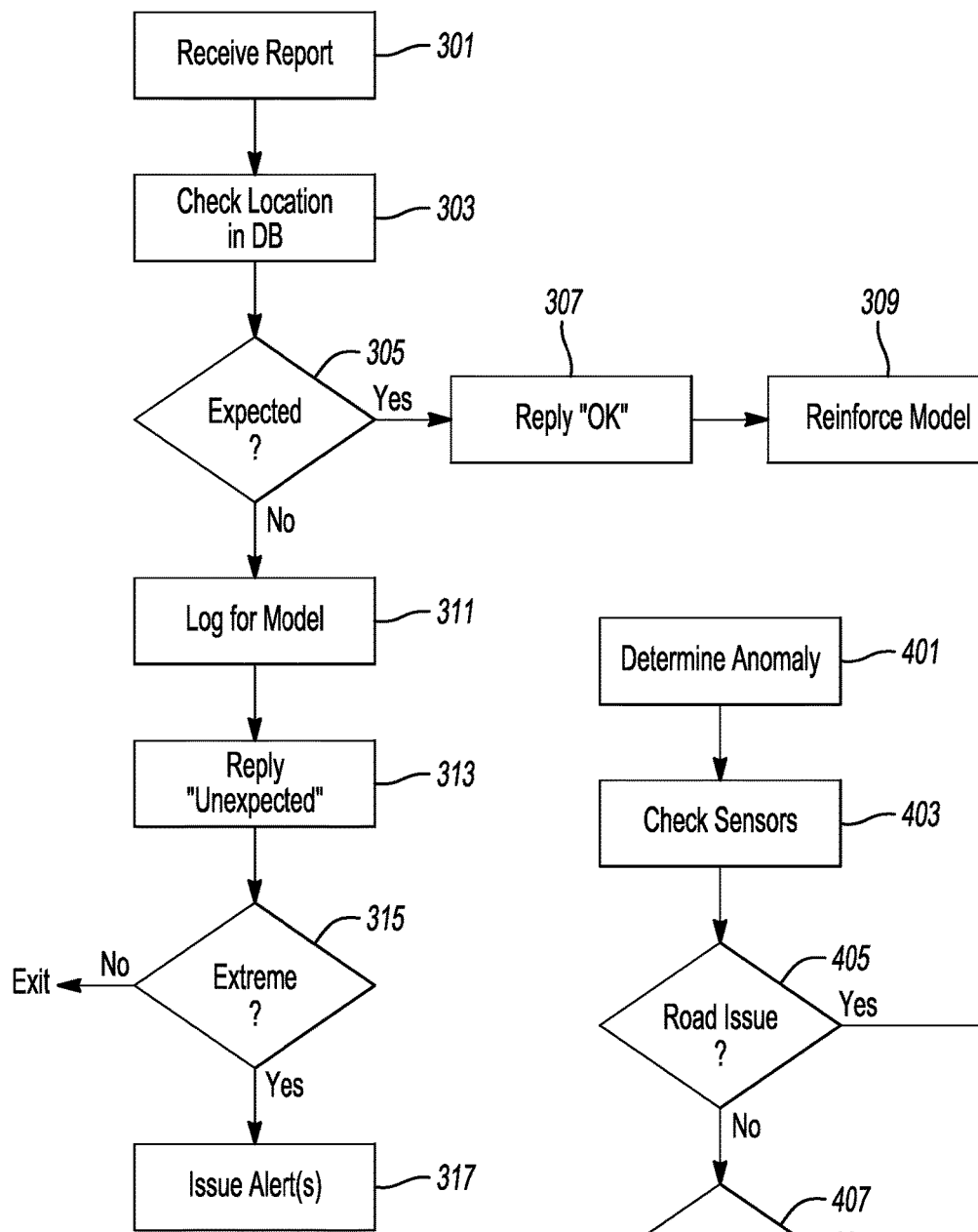
FIG. 3 shows an illustrative process for anomaly-report handling.

FIG. 3 shows an illustrative process for anomaly-report handling. In this example, the cloud 130 receives a report from one or more vehicles at 301. The vehicles 100, 110, 120 can connect through the gateway 131 and elements of the report can be parsed and added to the databases 133, 135 as appropriate. So, for example, if a vehicle 100 reports a confirmed anomaly then that location and fact could be added to the anomaly database 133. It may be added as temporary data until other vehicles confirm, or it may be added to reinforce existing data.

An updated driver profile can be added to the driver profile database 135, if those records are stored by the server. Driver profile records may be used by the server to determine whether behavior is truly erratic and for other assistance in analysis and reporting. These records can be updated periodically based on reporting or whenever the vehicle 100 reports an event or deviance.

The report in this example, received at 301, indicates observed erratic behavior, either of the observing vehicle or another vehicle observed by the observing vehicle 100. Since the vehicle 100 may be unaware of any anomalies, and it is likely unaware how traffic has been behaving at that particular location for the last hour, for example, the cloud 130 can prove a useful source of information, if it has logged both behavior and anomalies reported from that location over a period of time.

Based on a location associated with and included with the report, the process 137 can check the location in the database 133 to determine how many incidents, anomalies, erratic behavior sightings, etc. have occurred at that point or at areas near that point, since GPS coordinates, for example, often have a margin of error that is not insignificant. So in checking the database, the process 137 might look for records within a known GPS margin of error of the reported location.

If there is a known anomaly or multiple vehicles 110, 120 having already reported observed self or other vehicle erratic behavior at or near the reported location, the reported behavior might be classified as "expected" at 305. The process 137 can report back to the vehicle that the behavior is not actually erratic, or at least matches seemingly erratic behavior of others, either because of a known anomaly or unknown anomaly that may resolve later. If the deviance or anomaly is expected, known, modeled to be likely-correct, etc. at 305, the process can reply to the vehicle with a confirmation at 307, confirming the behavior as non-erratic or likely responsive to a known environmental condition. The reported and confirmed behavior can also be used to reinforce a model at 309 predicting such behavior at that location, or to reinforce the likely or reported presence of an environmental anomaly. The confirmation to the vehicle 100 can include a confidence score, for example, indicating the predicted likelihood that the behavior was appropriate or at least consistent. Confidence values can be updated based on more and more vehicles reporting an anomaly or erratic behavior. Explicit detection of an anomaly (e.g., a pothole) could result in a current confidence score of 100%, although this could decay over time if not reinforced (given the possibility of repair). Detection of a likely anomaly based on observed erratic behavior from a certain number of vehicles could result in a high confidence score, and if the score was over a threshold, this could be the impetus for an alert generation. For example, the alert could be sent to vehicles in a certain proximity to a location where the high-confidence anomaly was detected, and those vehicles could then make a more accurate assessment when reaching that location, if they ever reached that location.

For example, if most vehicles 100 swerve one foot left to avoid a pothole 150, reported swerving can be confirmed as "standard" behavior, but the same concepts with regards to standard deviations and other statistical analysis apply. That is, if the vehicle swerved four feet left, it would still be erratic relative to the crowd, and might represent an inexperienced driver who will generally react badly to road hazards. Thus, while the fact of the swerve could be confirmed as non-erratic, the degree of the swerve might still be labeled erratic and result in caution warnings to other drivers. This additional confirmation and consideration of range of deviance and similar factors can provide future alerts as well, based on a driver profile indicating that this driver swerves aggressively to avoid potholes. If this driver were approaching a known pothole at 70 mph, the system may alert nearby drivers that an aggressive swerve may be upcoming. In this manner, certain behavior can even be predicted based on past observation.

In another example, it may be observed that trucks swerve 1 foot to avoid a pothole and that sports cars swerve 2.5 feet, given the much higher likelihood of damage. Or trucks may pass over a piece of debris and sports cars may swerve 2 feet around it. These sorts of observation can help predict reactions to items in the road and let a driver know what to expect. It may also be useful to know if you are in the blind spot of a sports car that is approaching a pothole, that the sports car has a predicted likelihood of swerving into your lane, and information such as this can be used by semi-autonomous or autonomous vehicles to momentarily react to a potential threat, by, for example, dropping back until the vehicle is past the pothole.

If the behavior is unexpected at 305, the process can log the behavior for future consideration. Just because the behavior was not expected based on prior observation does not necessarily mean the behavior is definitively erratic, as someone must be the first person to encounter any environmental anomaly. So, for example, the process 137 can catalog the anomaly and wait some period of time or until some number of reports come from the same or a similar location to determine if the anomaly appears to be real. It there is a confirmed or highly likely environmental hazard, the process 137 can retroactively reclassify early-reported behavior, update driver profiles and report back to vehicles that the observed behavior was, in fact, non-erratic.

Initially, if the behavior appears erratic based on analysis, the process may reply that the behavior was unexpected at 313. This allows the vehicle 100 to log the behavior as confirmed unexpected, however that can always be changed in the future if later-data indicates otherwise. The vehicle 100 itself may later reclassify the behavior, if the driver consistently deviates in a repeated manner at or near a location, possibly indicating something that the driver wishes to avoid, even if the crowd doesn't appear to react in a similar manner.

If the deviance is classifiable as extreme, e.g., without limitation, if it is more than two standard deviations from an expected band or prior driver behavior, the process may classify the behavior as "extreme" or high alert at 315. This can result in issuance of an alert at 317 to nearby vehicles 110, 120 and, in some instances, even an alert to authorities.

For example, an initial "extreme" alert may be issued to nearby vehicles, but if the vehicle 100 continues to exhibit unexpected behavior classifiable as "extreme," over a predetermined time period or distance, the process may alert the authorities at 317 in case the driver is in distress or represents a legitimate risk to other drivers. Such alerts can also include the observed data and predictions, to allow other vehicles or authorities to determine if a response is warranted.

Figure 4:
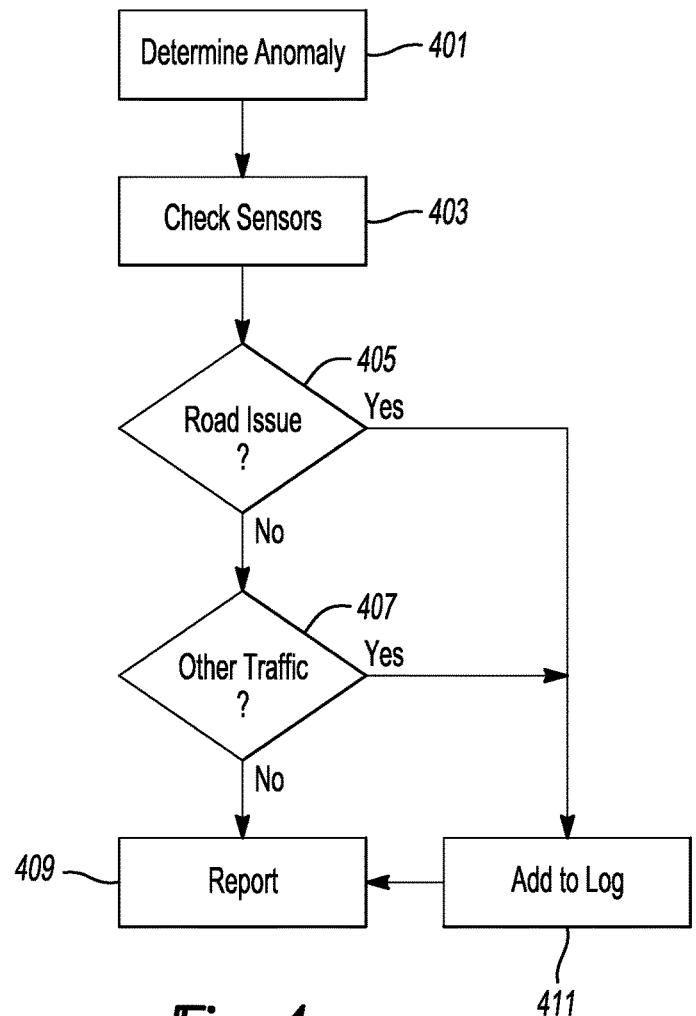
FIG. 4 shows an illustrative process for local anomaly confirmation and analysis.

FIG. 4 shows an illustrative process for local anomaly confirmation and analysis. IN this example, a vehicle detects an anomaly based on a change in driver behavior or an observed other vehicle behaving in a seemingly unexpected manner at 401. This can include the variables discussed above (speed, braking, swerving) or any other tracked behavior exhibiting threshold deviance above expectations (e.g., standard deviation).

Once the behavior is detected, the vehicle 100 can check sensors at 403 to determine if any events are detectable or were logged that might explain the behavior. For example, if a driver swerves, the vehicle 100 could check a rear-camera to see if other drivers are swerving. If the vehicle 100 accelerates, the process could check a distance to a leading vehicle to see if the leading vehicle is also accelerating. The process may also check suspension shock and other factors that might indicate a near-miss or light-strike of a pothole or object that the driver was swerving to avoid, for example.

If the sensors reveal an issue with the roadway at 405, then the behavior can be logged as possibly responsive to that behavior at 411. That is, the vehicle 100 may report the behavior, but in case the cloud is unaware of the anomaly the vehicle 100 also detected, the vehicle 100 may also indicate the detected anomaly at that location. In a similar manner, even if the vehicle 100 does not detect the anomaly, it may detect other traffic moving in a similarly unexpected manner at 407 and/or may receive local V2X reports that other vehicles are self-reporting that they are experiencing similar unexpected behavior. Again, the vehicle 100 can log this indicator with the record of self-observed unexpected behavior as a possible explanation or context for the behavior. The cloud can use this information to bolster conclusions, inform other drivers, update driver profiles and generally build better context around observed and reported anomalous behavior.

Once any logging of data has occurred, in the manner described above or in similar contextual manners, the vehicle 100 can report the data at 409. This includes reporting any self-observed anomalies as well as reporting any possible context logged with respect to the anomalies that might indicate a root-cause offboard the vehicle 100.

Figure 5:
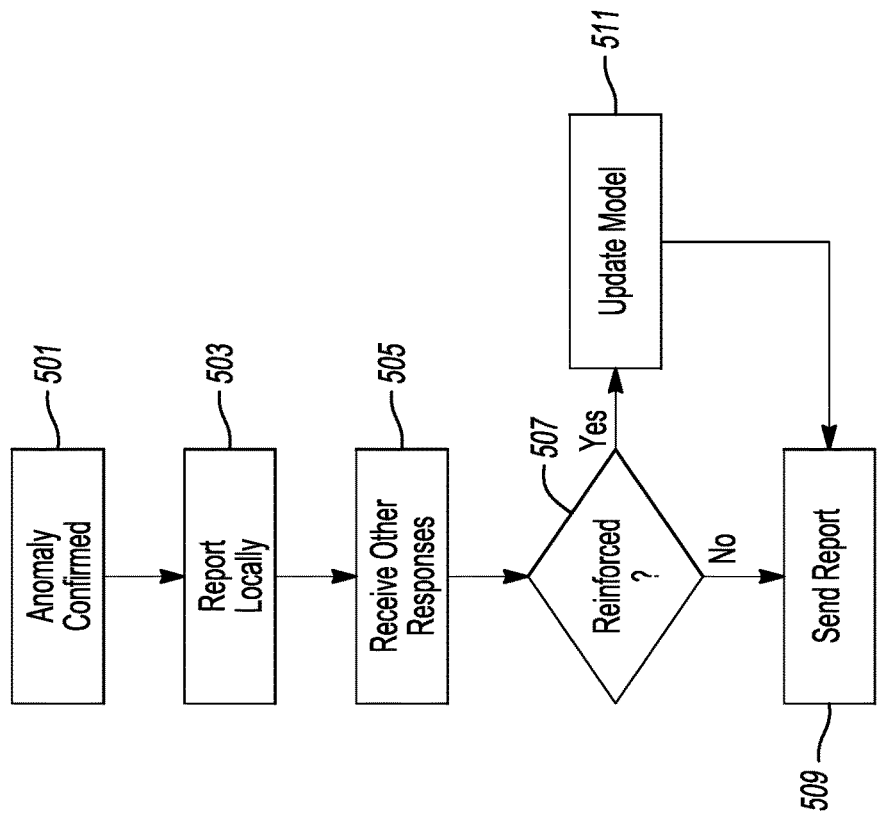
FIG. 5 shows an illustrative local communication process.

FIG. 5 shows an illustrative local communication process. This is a process that vehicles 100 can use to locally communicate with each other and inform each other of both observed behavior (self or others) and/or any possible observed context sensed by the vehicle 100. In this example, the vehicle 100 is reporting a detected anomaly that is represented by, for example, a sensed roadway deviance or a sensed traffic behavior deviance (e.g., multiple vehicles are observed swerving around something).

The vehicle 100 confirms an anomaly based on direct sensing or contextual observation at 501. Contextual observation can be both the object vehicle and/or leading or trailing vehicles exhibiting similar avoidance behavior, likely indicative of an existing anomaly. The vehicle 100 reports the data locally to other vehicles, which can include V2V communication or V2I communication whereby the data is reported to infrastructure elements for relay to other vehicles.

Other vehicles may be able to reinforce or contradict the data. For example, a vehicle may observe a swerve in a leading vehicle and may experience a swerve as well, indicating both vehicle were attempting to avoid something that the vehicle 100 did not detect. The vehicle 100 may report this behavior locally, and a vehicle further ahead or coming up behind may indicate that its driver did not swerve, but that there was a suspension reaction. Another vehicle may report a similar swerve. All of this data tends to reinforce the context that there is something in the road that should be avoided, and that none of the seemingly erroneous behavior was inappropriate. The original vehicle 100 can receive these responses at 505 and determine if the responses reinforce contextual conclusions at 507.

If all the other vehicles indicated no change or no detection, then it is possible that, in the example above, the observed vehicle and the object vehicle both avoided an animal or other temporary impediment, or that both happened to simply swerve. In that instance, the responsive data is not reinforcing of a conclusion about exterior context. The vehicle 100 can update the model for that location, if the data indicates reinforcement, as well as update the model for how the driver is expected to behave at 511. That is, if the driver's behavior was not ultimately unexpected, the vehicle 100 can reinforce that the driver tends to avoid obstructions and that the driver has not indicated a propensity for unexpected swerving (for example).

Again, the vehicle 100 can report the observations, reinforcements, current models for its own driver and the likelihood of exterior conditions at a given location at 509.

Figure 6:
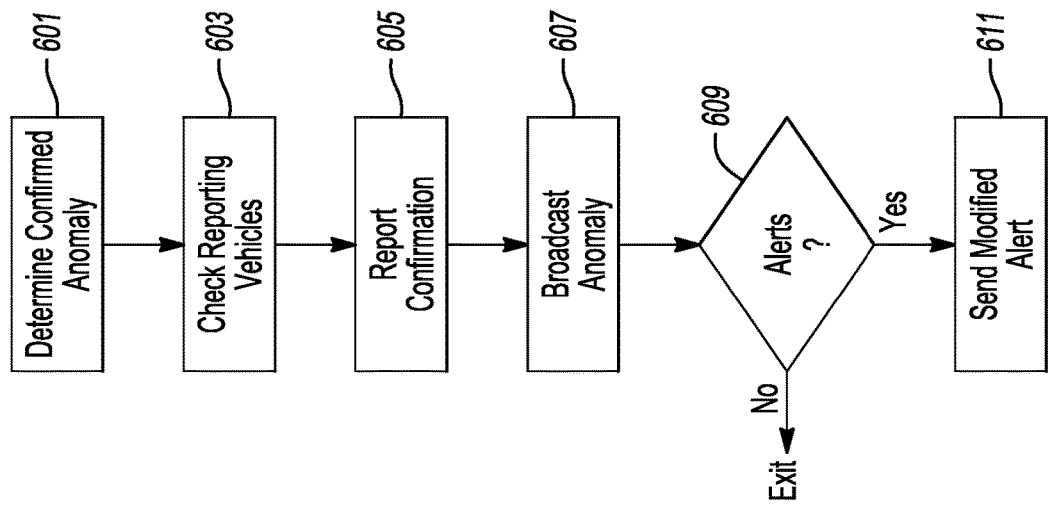
FIG. 6 shows an illustrative anomaly update process.

FIG. 6 shows an illustrative anomaly update process. This example is a cloud-side process that receives indications of exterior (to vehicles) context such as potholes or other potential environmental or external factors that may cause certain behavior and/or that may indicate that certain behavior is actually desirable. The process may have received one or more indications of an anomaly confirmation at 601, such that a threshold for confirming the contextual factor has been achieved, which may warrant addition of the factor to a database as a permanent or temporary condition.

Since the process may be relying on data from a plurality of vehicles about a certain locality, the process can check both with those vehicles and other vehicles now in proximity at 603. The originally reporting vehicles 100 may reveal additional context not yet reported, and new vehicles at the location may confirm or rebut the presence of the external factor based on their own present observations. If the anomaly is confirmed, the process can communicate this fact to all of the originally reporting vehicles at 505, which may have the anomaly still logged as unconfirmed, awaiting more data. Those vehicles 100 can then update their own internal records about that location and about the driver behavior, which will have then been confirmed as likely appropriate.

The process may also broadcast the anomaly to a plurality of vehicles that are within a certain range of the external factor, so that other vehicles that may encounter the factor now have the information available. This also helps those vehicles observe behavior under the correct context if they encounter the location, and can help redefine what is "expected" behavior for vehicles at that location, which can help avoid drawing false conclusions about observed behavior, onboard or externally.

If the anomaly had already generated an alert, and/or if behavior had generated an alert (e.g., reporting a likely anomaly or reporting a likely "dangerous" vehicle based on behavior) at 609, those alerts can be modified in light of the confirmed context, which can allow the receiving vehicles (receiving the alerts) to react accordingly by updating onboard data stores and informing drivers of any changes based on the reporting.

By using feedback, sensing and cooperative information sharing, the illustrative embodiments and the like allow for improved conclusions to be drawn about observed vehicular behavior, which in turn improves the ability of autonomous and semi-autonomous vehicles to react to detected behavior, as well as improves the ability of those vehicles to navigate unexpected external challenges. At the same time, drivers can be given up-to-date and accurate information about whether there are areas or vehicles that should be avoided, and whether a vehicle observed behaving in an unexpected manner was, in fact, behaving appropriately.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   a processor configured to:
   determine that erratic vehicle behavior has been sensed, based on comparison of a sensed vehicle behavioral characteristic at a given location compared to a predefined expected value of the characteristic;
   determine whether an environmental anomaly has been detected in association with the given location;
   classify the sensed erratic behavior based on whether the environmental anomaly was detected;
   responsive to classifying the sensed erratic behavior as erratic based on determining no environmental anomaly was detected, report the sensed erratic behavior to a remote server, along with the given location, wherein driving operations of at least one vehicle are controlled based on the classification of the sensed erratic behavior;
   broadcast the sensed erratic behavior responsive to classifying the sensed erratic behavior as erratic;
   receive an indication from at least one other vehicle, responsive to the broadcast, the indication indicating a presence of an environmental anomaly detected by the at least one other vehicle; and
   reclassify the sensed erratic behavior as a non-erratic behavior based on the indication.

2. The system of claim 1, wherein the erratic vehicle behavior is that of a vehicle including the processor.

3. The system of claim 1, wherein the erratic vehicle behavior is that of a vehicle sensed by a sensor of a vehicle including the processor.

4. The system of claim 1, wherein the processor is configured to request information from the remote server relating to the given location to determine if the environmental anomaly has been identified at the remote server.

5. The system of claim 1, wherein the processor is configured to sense the environmental anomaly using one or more onboard sensors as a vehicle including the processor drives past the given location.

6. The system of claim 1, wherein the observed behavioral characteristic was observed for a vehicle including the processor, and wherein the predefined expected value of the characteristic is obtained from a profile of a driver of the vehicle, stored locally in a memory of the vehicle.

7. A system comprising:
   a processor configured to:
   receive a report of observed erratic behavior relating to a first vehicle at a location;
   access reporting from a plurality of other vehicles indicating whether the plurality of other vehicles observed one or more indicators of an anomaly at the location, including express detection of the anomaly by a reporting-vehicle sensor;
   responsive to the plurality of other vehicles observing the one or more indicators of the anomaly, respond to the report with an indication that the behavior is non-erratic;
   based on the report, update data indicating a presence of the anomaly at the location, including updating a confidence value, the updating including setting the confidence value to maximum responsive to any reported express detection, and wherein the confidence value decays from the maximum as a function of time since the express detection was reported; and
   responsive to the updating resulting in the confidence value being above a threshold, send an alert to vehicles within a predefined proximity of the location, indicating the presence of the anomaly, wherein driving operations of at least one vehicle are controlled based on the updated data.

8. The system of claim 7, wherein the update includes an update to a driver profile associated with a known driver of the first vehicle, to indicate that the observed erratic behavior was non-erratic based on the plurality of other vehicles observing the one or more indicators of the anomaly.

9. The system of claim 7, wherein the processor is further configured to: respond to the report with an indication that the behavior is erratic, responsive to data associated with the location, in a database accessible by the processor, failing to indicate the presence of the anomaly.

10. The system of claim 9, wherein the update includes an update to a driver profile associated with a known driver of the first vehicle, to indicate that the observed erratic behavior was erratic responsive to the data failing to indicate the presence of the anomaly.

11. The system of claim 7, wherein the erratic behavior relates to lane-keeping and the report indicates that the first vehicle was detected exhibiting more than a threshold deviance from a lane-of-travel.

12. The system of claim 7, wherein the erratic behavior relates to acceleration and wherein the report indicate that the first vehicle exhibited more than a threshold deviance of acceleration change over an observed period of time.

13. The system of claim 7, wherein the erratic behavior relates to velocity and wherein the report indicate that the first vehicle exhibited more than a threshold deviance of velocity changeover an observed period of time.

14. The system of claim 7, wherein the one or more indicators of the anomaly include at least one of observed erratic behavior of at least one vehicle at the location or express sensing of the anomaly via the reporting-vehicle sensor.

15. A method comprising:
  determining that erratic vehicle behavior has been sensed, based on comparison of a sensed vehicle behavioral characteristic at a given location compared to a predefined expected value of the characteristic, defined with respect to a driver profile for a driver of a vehicle for which the erratic behavior was sensed;
  determining whether an environmental anomaly has been detected in association with the given location, based on at least one of memory onboard the vehicle indicating a record of the anomaly or a sensor of the vehicle sensing the anomaly;
  classifying the sensed erratic behavior based on whether the environmental anomaly was detected;
  responsive to classifying the sensed erratic behavior as erratic based on determining no environmental anomaly has been detected, reporting the sensed erratic behavior to a remote server, along with the given location, wherein driving operations of at least one vehicle are controlled based on the classification of the sensed erratic behavior;
  broadcasting the sensed erratic behavior responsive to classifying the behavior as erratic;
  wirelessly receiving an indication from at least one other vehicle, responsive to the broadcast, the indication indicating a presence of an environmental anomaly detected by the at least one other vehicle; and
  reclassifying the sensed erratic behavior as a non-erratic behavior based on the indication.

* * * * *